United States Patent [19]

Kravitz et al.

[11] Patent Number: 4,930,159

[45] Date of Patent: May 29, 1990

[54] NETBIOS NAME AUTHENTICATION

[75] Inventors: Jeffrey K. Kravitz; Charles C. Palmer, both of Yorktown Heights, N.Y.

[73] Assignee: International Business Machines Corporation, Armonk, N.Y.

[21] Appl. No.: 298,387

[22] Filed: Jan. 18, 1989

[51] Int. Cl.$^5$ .............................................. H04J 15/00
[52] U.S. Cl. ................... 380/23; 340/825.31; 340/825.52; 235/380; 364/242.95; 364/245.8; 364/253.2; 364/285.4; 370/58.1; 370/94.1; 380/25
[58] Field of Search ....................... 340/825.31, 825.32, 340/825.33, 825.34, 825.52; 235/380, 382, 382.5; 364/242.95, 245.8, 253.2, 285.4, 286.5; 370/58.1, 94; 380/23, 24, 25

[56] References Cited

U.S. PATENT DOCUMENTS

| 4,652,698 | 3/1987 | Hale et al. .............................. 380/24 |
| 4,718,005 | 1/1988 | Feigenbaum ......................... 364/200 |
| 4,794,644 | 12/1988 | Philip et al. ............................ 380/23 |
| 4,799,258 | 1/1989 | Davies .................................... 380/23 |

Primary Examiner—Thomas H. Tarcza
Assistant Examiner—David Cain
Attorney, Agent, or Firm—Whitham & Marhoefer

[57] ABSTRACT

A method insures the NETBIOS names are not illegally used on a local area network. The NETBIOS protocols use a naming system that allows any station to claim a name or set of names that are not already in use. This potentially allows any user to "masquerade" as another user, or service machine, by claiming the name when the real user is not connected to the network. This method detects these attempted masquerades, disconnects the offending station from the network, and logs information about the attempt.

18 Claims, 4 Drawing Sheets

NETBIOS NAME AUTHENTICATION

BACKGROUND OF THE INVENTION

1. Field of the Invention

This invention generally relates to computer communication systems and, more particularly, to limiting access to a local area network (LAN). The invention is described in terms of a particular type of LAN, specifically the IBM Personal Computer (PC) Token Ring LAN; however, the techniques employed may find application in other and different LANs. Further, the invention is not limited to PCs but is more broadly applicable to workstations or terminals connected to the LAN.

2. Description of the Prior Art

With the proliferation of PCs and microprocessor based workstations and the vastly improved performance to price ratio of these computers, there has been a dramatic increase in the networking of PCs and workstations. LANs allow users to share files, support electronic mail and perform other functions which were previously identified as mainframe or minicomputer functions supporting a plurality of terminals. Now, even the most modest enterprise can afford a computing system that just a few short years ago would not have been economically feasible.

LANs generally are implemented in one of several topologies, referred to as star, ring or bus. The star topology is characterized by a central hub to which the several PCs or workstations in the LAN are connected. In the ring topology, messages circulate around the ring from workstation to workstation. The bus topology requires a headend server which receives transmissions from individual workstations and retransmits those messages on the bus.

LANs are also distinguished by the manner in which arbitration is accomplished among the several workstations connected to the network. In a token-ring LAN of the type announced by IBM in October 1985, a token is circulated around the ring. In order to transmit on the network, a workstation connected to a node of the ring must have the token. A workstation having the token can attach addressing information and data to the token and request service from another workstation in the network. IEEE standard 802.5 specifies a token in a ring topology; however, IEEE standard 802.4 also specifies a token in a bus topology. Thus, the token approach to arbitration is not limited to a specific topology, although the preferred embodiment of the invention disclosed and claimed herein is implemented on IBM's Token-Ring Network.

All Token-Ring adapter cards respond to a specific 6-byte address. There are two types of these addresses: locally administered addresses which can be assigned by the user, and universally administered addresses which are unalterable. These unalterable addresses are administered by the IEEE and are guaranteed by that body to be unique. During all communication between two adapters, the Token-Ring adapter ensures that the address of the sender appears in all frames, independent of the workstation software. These addresses are guaranteed to be unique within a LAN ring.

The NETBIOS (NETwork Basic Input/Output System) protocol layer provides workstation applications with a more convenient addressing scheme through the ability to define one or more 16-byte alphanumeric name to which communications from other adapters may be directed. Using NETBIOS, workstations around the ring can be known by any of several names such as the user's name, the office location, the application running on the workstation, among other things.

When a given workstation, say client-1, wishes to use a specific ring name, the NETBIOS in client-1 broadcasts to all workstations on the ring an add-name or add-group-name query message. If no other workstation responds saying that it is already using that name, the client-1 workstation is then free to use that name. There is no provision in the NETBIOS software for assigning and enforcing adapter-specific user ID (identification) and passwords and it does not maintain a ring name transaction log.

It is desirable to have fixed names for specific workstations on the ring. Applications like file and print servers must be known to the network by a publicized name so that users may make use of them. Users also should have the option of being known on the ring by their own name or other unique ID. The NETBIOS name support described above is designed to meet both of these goals. However, it does not provide any way of reserving certain names for specific workstations. For example, suppose that a printer server workstation has been established on the ring and is referred to via the name PRSERVER. If for some reason this print server goes down, its name is then no longer in use. This would allow some other workstation to ask for and be given the use of that same name. If this happens, then when the printer server is brought up, most probably in a turn-key type mode, it would not be allowed to be known on the ring by the name PRSERVER. As a result, all applications that normally send output to the printer server via the name PRSERVER will now be sending output to this imposter workstation. Similarly, if a manager's workstation is typically known on the LAN by the name ASHTON, then any workstation user that accesses the LAN before that manager does could claim the name ASHTON for its own name or misuse.

SUMMARY OF THE INVENTION

It is therefore an object of this invention to provide a technique that insures that NETBIOS names are not illegally used on a LAN.

It is another object of the invention to provide a method of detecting attempted masquerades on a LAN.

It is a further object of the invention to prevent an unauthorized connection of a workstation to a LAN and to log information about attempts to make an unauthorized connection.

According to the invention, there is provided a dedicated workstation running a program called a name authenticator. This program does not make use of the NETBIOS layer; rather, it is written to access the ring via lower level protocols. Because it is using this lower layer, the program can monitor all broadcast messages without screening by the NETBIOS layer. The name authenticator program monitors the ring for the name-query messages from workstations attempting to claim names. When one is detected, the data frame is decoded to obtain the requested name and the unique adapter address of the requesting adapter. A table is used to verify that the requested name matches the previously assigned adapter address. If so, then nothing further is done. Otherwise, the name authenticator program constructs a special frame that when transmitted around the ring to the offending workstation, will instruct its adapter to remove itself from the ring. The offending workstation user and software have no control over this removal mechanism since the directive is acted upon by the adapter hardware. A record of these attempts is maintained. An optional record of all name-related activity can also be selected.

BRIEF DESCRIPTION OF THE DRAWINGS

The foregoing and other objects, aspects and advantages of the invention will be better understood from the following description of a preferred embodiment of the invention with reference to the drawings, in which.

DETAILED DESCRIPTION OF A PREFERRED EMBODIMENT OF THE INVENTION

Figure 1:
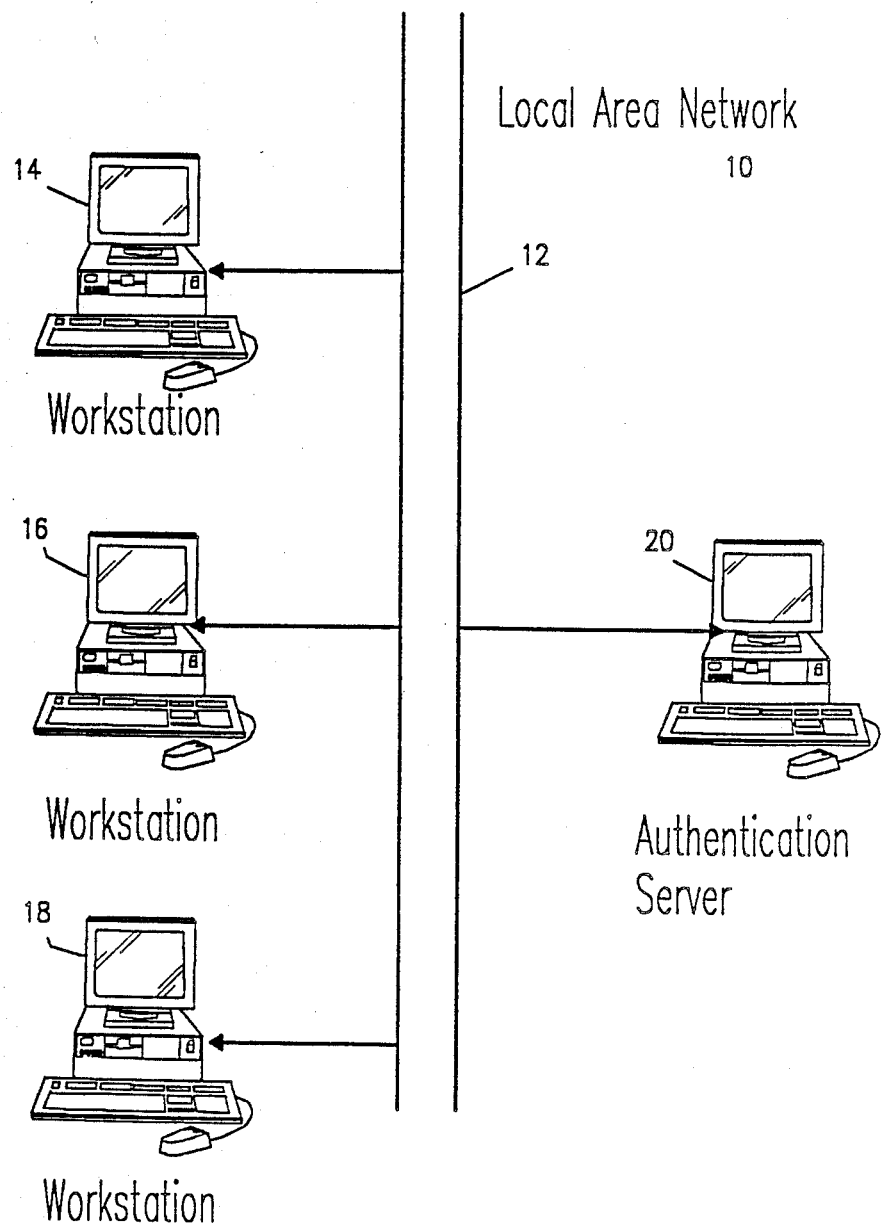
FIG. 1 is a pictorial diagram depicting a typical LAN with general workstations and a name authenticator workstation.

Referring now to the drawings, and more particularly to FIG. 1, there is shown a typical local area network (LAN) 10 comprising a common cabling system 12 to which a plurality of workstations 14, 16 and 18 are connected. It will be understood by those skilled in the art that the workstations are equipped with a suitable adapter card (not shown) and that the cabling system may have a bus or ring topology and implemented as a coaxial cable, twisted pair, fiber optic cable or any other supported communication media. Moreover, those skilled in the art will also understand that the several workstations need not be physically identical and may have differing features. According to the present invention, one workstation in the network is designated as an authentication server. This workstation is shown in FIG. 1 as workstation 20, and is physically attached to the network in the same manner as the other workstations.

Figure 2:
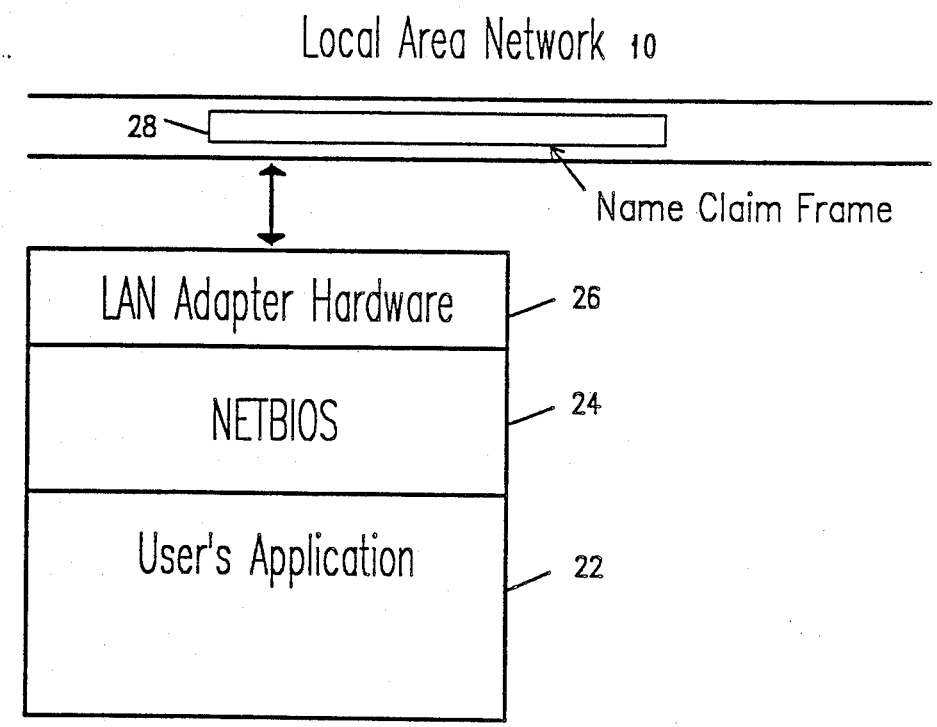
FIG. 2 is a block diagram showing a particular implementation of a Name Claim transaction, more specifically, the one used by NETBIOS.

FIG. 2 maps the conceptual layers in a workstation as comprising a user's application or program 22 which communicates through the NETBIOS 24 to the LAN adapter hardware 26. Although not shown, it will be understood that the application 22 runs on an appropriate operating system (OS) which actually makes the calls to the NETBIOS 24. The adapter hardware 26 is typically in the form of a printed circuit card which plugs into a workstation's bus and provides the interface to the LAN 10.

In operation, the user's application 22 requests NETBIOS 24 to add a name that the application will be known by on the network. NETBIOS 24 broadcasts a number of Name Claim frames 28 on the network 10 to determine if the name is in use by another workstation. If no reply is received in a predetermined interval, NETBIOS 24 assumes that the name is not in use and adds it to an internal table for use by this workstation.

Figure 3:
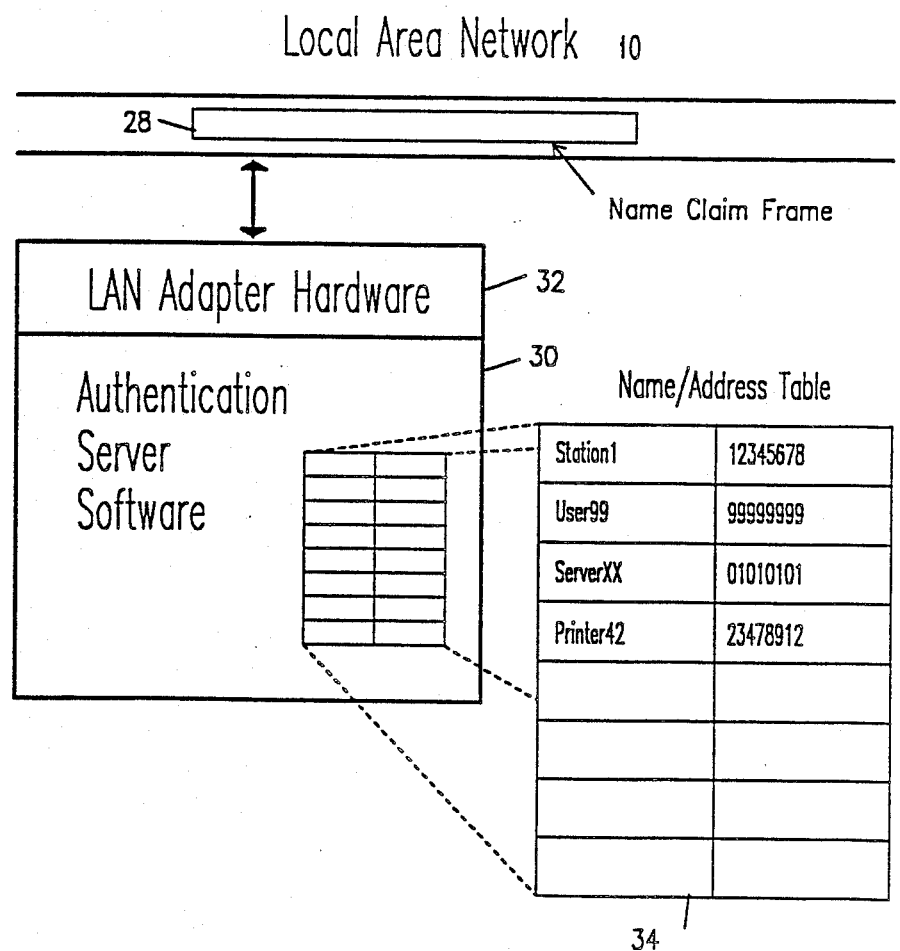
FIG. 3 is a block diagram similar to FIG. 2 showing the Name/Address table used by the Name Authenticator.

FIG. 3 shows the authentication server software 30 which communicates through the LAN adapter hardware 32 to the local network 10. This software includes a name/address table 34 used to perform the authentication operation according to the invention.

Figure 4:
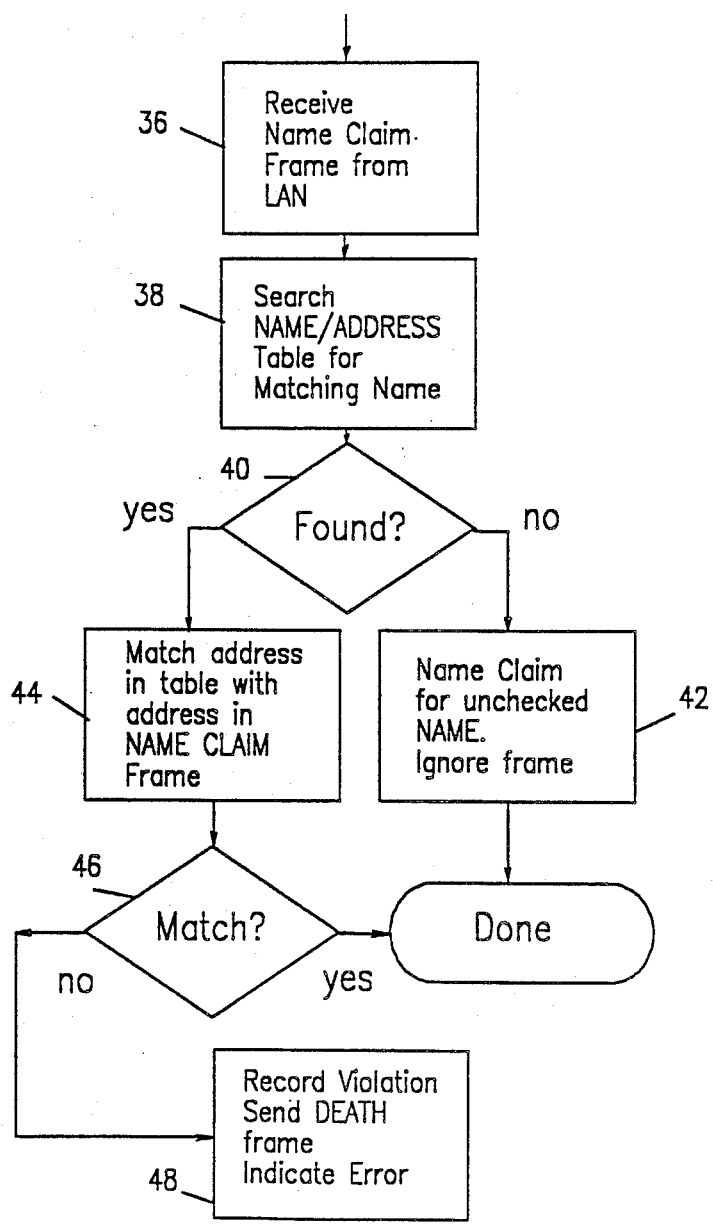
FIG. 4 is a flow diagram illustrating the logic of the Name Authentication process according to the invention.

The logic of the process is shown in the flow diagram of FIG. 4, to which reference is now made. At the authentication workstation 20, the process begins when a name claim frame 28 is received from the LAN as shown in function block 36. In function block 38, a search is made of table 34 in an attempt to find a matching name. A test is then made in decision block 40 to determine if a matching name was found in Name/Address table 34, and if not, the frame is ignored in function block 42 and the process terminates. On the other hand, if the test in decision block 40 is positive, then an attempt is made in function block 44 to match the address in table 34 with the address in the Name Claim frame 28. If a match is found in decision block 46, the process terminates. However, if the test in decision block 46 is negative, that is, no match is found for the address in table 34 and the address in the name claim frame 28, then, in function block 48, a violation is recorded, a disconnect frame is transmitted on the LAN 10 to the offending workstation, and an error is indicated at the authentication station 20 to alert a system monitor that there has been an unauthorized attempt to connect to the network.

The logic of the process shown in the flow diagram of FIG. 4 is implemented in the following pseudocode, from which a programmer of ordinary skill in the art can write source code in any desired and appropriate programming language, such as BASIC, C, and Pascal:

```
Wait for Receipt of FRAME from LAN
Is received frame a NAME CLAIM frame?
If NO, then ignore frame and continue waiting
If YES, then
        Search the Authorization Table matching the
            name from NAME CLAIM frame against the names
            in the table entries
        Was the name found in the table?
        If NO, then ignore the frame and continue
            waiting
        If YES, then
            Does the LAN ADDRESS in the NAME CLAIM
                frame match the LAN ADDRESS in the
                Table Entry found in previous step?
            If YES, then ignore the frame and
                continue waiting
            If NO, then
                Transmit a DETACH STATION frame to
                    the Station that originated the
                    NAME CLAIM frame (for LANs
                    supporting Detach Station frames)
                    or Transmit a NAME IN USE frame
                    to the Station that originated
                    the NAME CLAIM frame (for LANs
                    not supporting Detach Station
                    Frames)
                Record Authorization Violation in a
                    log file
                Indicate ERROR at Authentication
                    Station
```

To ease the maintenance of the valid name table or directory 34, the authenticator program 30 also accepts special messages from certain other workstations on the network requesting various directory functions. These include add name entry, delete name entry, update name entry, and find name entry. These functions are limited to certain unique adapter addresses by protected privileged entries in the directory. Using this technique, all maintenance of the directory may be handled without interruption of the other functions the program provides. Reports of the activity logs may also be requested in this manner. Although it is typically used to reserve certain names for the use of server machines and special users, this program can also be used to limit the names allowed on the ring to those in the directory. Since NETBIOS allows the user complete freedom in his choice of ring name, this program provides improved LAN accountability through ring name activity control and tracking.

While the invention has been described in terms a specific preferred embodiment in the environment of the IBM PC Token-Ring Network, those skilled in the art will recognize that the invention has broader application. For example, the invention may be used on other and different LANs and is not necessarily limited to a ring topology. Therefore, it will be understood that the invention may be practiced with modification within the spirit and scope of the appended claims.

Having thus described our invention, what we claim as new and desire to secure by Letters Patent is as follows:

1. A method for preventing unauthorized workstations from being serviced on a local area network comprising the steps of:
   monitoring all broadcast messages on the network to detect name-query messages from workstations attempting to claim names;
   decoding a data frame in a name-query message to obtain a requested name and a unique adapter address of a requesting workstation; and
   verifying that a requested name matches a previously assigned adapter address.

2. The method according to claim 1, used to prevent the use of reserved names, further comprising the steps of:
   in the event that a requested name does not match a previously assigned adapter address, constructing a special frame that instructs an offending workstation to remove itself from the network, for networks supporting such a frame, or that informs the offending workstation the name is already in use; and
   transmitting said special frame on the network.

3. The method according to claim 2 further comprising the step of logging information about an attempt to claim a name that does not match a previously assigned adapter address.

4. A method for preventing unauthorized use of reserved names in a local area network comprising the steps of:
   providing a name/address table in an authentication server attached to said network;
   monitoring at said authentication server all broadcast messages on the network to detect name-query messages from workstations attempting to claim names;
   comparing a requested name in a name-query message with names in said name/address table, and if no match is found, continuing to monitor said broadcast messages;
   if a name match is found in said name/address table, comparing an address accompanying the requested name with addresses in said name/address table, and if a match is found, continuing to monitor said broadcast messages; and
   if no address match is found in said name/address table, preventing an offending workstation from being recognized on the network.

5. The method according to claim 4 wherein said network supports a disconnect frame and said step of preventing is performed by the steps of:
   constructing a disconnect frame that instructs the offending workstation to remove itself from the network; and
   transmitting on said network by said authentication server said disconnect frame.

6. The method according to claim 4 wherein said step of preventing is performed by the steps of:
   constructing a special frame that informs the offending workstation that the name is already in use; and
   transmitting on said network by said authentication server said special frame.

7. The method according to claim 4 further comprising the step of logging information about an attempt to claim a name that does not match a previously assigned adapter address.

8. The method according to claim 4 further comprising the step of generating an error indication at said authentication server to indicate an attempt to claim a name that does not match a previously assigned adapter address.

9. The method according to claim 4 further comprising the steps of:
   logging information about an attempt to claim a name that does not match a previously assigned adapter address; and
   generating an error indication at said authentication server to provide an indication of said attempt.

10. A system for preventing unauthorized workstations from being serviced on a local area network comprising:
    means for monitoring all broadcast messages on the network to detect name-query messages from workstations attempting to claim names;
    means for decoding a data frame in a name-query message to obtain a requested name and a unique adapter address of a requesting workstation; and
    means for verifying that a requested name matches a previously assigned adapter address.

11. The system according to claim 10, further comprising means for preventing the use of reserved names, comprising:
    means for constructing a special frame that instructs an offending workstation to remove itself from the network, for networks supporting such a frame, or informs the offending workstation the name is already in use, for other networks, in the event that a requested name does not match a previously assigned adapter address; and
    means for transmitting said special frame on the network.

12. The system according to claim 11 further comprising means for logging information about an attempt to claim a name that does not match a previously assigned adapter address.

13. A system for preventing unauthorized use of reserved names in a local area network comprising:
    an authentication server attached to said network;
    a name/address table in said authentication server;
    means, at said authentication server, for monitoring all broadcast messages on the network to detect name-query messages from workstations attempting to claim names;

means for comparing a requested name in a name-query message with names in said name/address table, and if no match is found, continuing to monitor said broadcast messages;

means, if a name match is found in said name/address table, for comparing an address accompanying the requested name with addresses in said name/address table, and means, if such a match is found, for continuing to monitor said broadcast messages; and means, if no address match is found in said name/address table, for preventing an offending workstation from being recognized on the network.

14. The system according to claim 13 wherein said network supports a disconnect frame and said preventing means comprises:

means for constructing a disconnect frame that instructs the offending workstation to remove itself from the network; and means for transmitting on said network by said authentication server said disconnect frame.

15. The system according to claim 13 wherein said preventing means comprises:

means for constructing a special frame that informs the offending workstation that the name is already in use; and means for transmitting on said network by said authentication server said special frame.

16. The system according to claim 13 further comprising means for logging information about an attempt to claim a name that does not match a previously assigned adapter address.

17. The system according to claim 13 further comprising means for generating an error indication at said authentication server to indicate an attempt to claim a name that does not match a previously assigned adapter address.

18. The system according to claim 13 further comprising:

means for logging information about an attempt to claim a name that does not match a previously assigned adapter address; and means for generating an error indication at said authentication server to provide an indication of said attempt.

* * * * *